Sept. 15, 1953     D. W. HALFHILL     2,652,545
DEVIATION COMPENSATOR
Filed April 30, 1952

INVENTOR
DONALD W. HALFHILL
by Russell A. Warner
His Attorney

Patented Sept. 15, 1953

2,652,545

UNITED STATES PATENT OFFICE 2,652,545

DEVIATION COMPENSATOR

Donald W. Halfhill, Marblehead, Mass., assignor to General Electric Company, a corporation of New York Application April 30, 1952, Serial No. 285,345

4 Claims. (Cl. 336—135)

The present invention relates to arrangements for minimizing errors in electro-mechanical telemetering and control systems. Particularly, this invention is concerned with apparatus which automatically compensates for errors of both mechanical and electrical origin in systems wherein the angular orientations of a rotatable member represent intelligence.

As will appear more fully hereinafter, the improved deviation compensator which is the subject of this application is an electro-mechanical device having a stator and a rotor, the arrangement being such that an alternating current output signal of a desired one of two opposite phases and of a desired amplitude may be secured when the rotor is oriented at any one of a multitude of predetermined angular positions in relation to the stator. The compensator is utilized with particular advantage in systems wherein electrical signals control the angular positions of a rotatable member and wherein, because of errors of both electrical and mechanical origin contributing to errors in the orientations of the rotatable member, it is beneficial to inject into the system at an appropriate place signals of the precise phase and magnitude to compensate for erroneous deviations by causing further angular orientations of the rotatable member which align that member with the theoretically correct positions. Detailed arrangements embodying error or deviation compensators of the same general character for similar purposes may be observed with reference to the patent of John E. Lundberg et al. for a Deviation Compensator, Number 2,519,058, issued on August 15, 1950, and the patent to John E. Lundberg et al. for an Error Compensator, Number 2,570,826, issued on October 9, 1951.

The subject deviation compensator arrangement is one which has no windings on the stator structure, the exciting and output signal windings both being supported by the rotor structure, and changes in the phase and amplitude of the compensator output signals are simply and readily achieved by movements of small members of flux-conducting material distributed at fixed angular positions about the stator. Further, the compensator structure has only a single output winding arrangement, consisting of two coils, which itself requires no adjustment for variations in the output signals, and has output signal adjusting means which are of a construction permitting a large number of stations to be incorporated into the compensator.

Accordingly, it is one object of the present invention to provide a novel and improved compensator device for automatically minimizing errors in telemetering and control systems.

A second object is to provide a deviation compensator for producing electrical outputs of compensation signals when rotor and stator elements thereof have predetermined angular orientations, and wherein the stator has no windings or wiring thereon.

Further, it is an object to provide a compensator device having a single output signal winding and having movable flux-conducting members for effecting variations in the phase and amplitude of compensation signals.

These and other objects and features of the subject invention are disclosed in detail in the following description, wherein reference is made to the accompanying drawings, in which.

Figure 1:
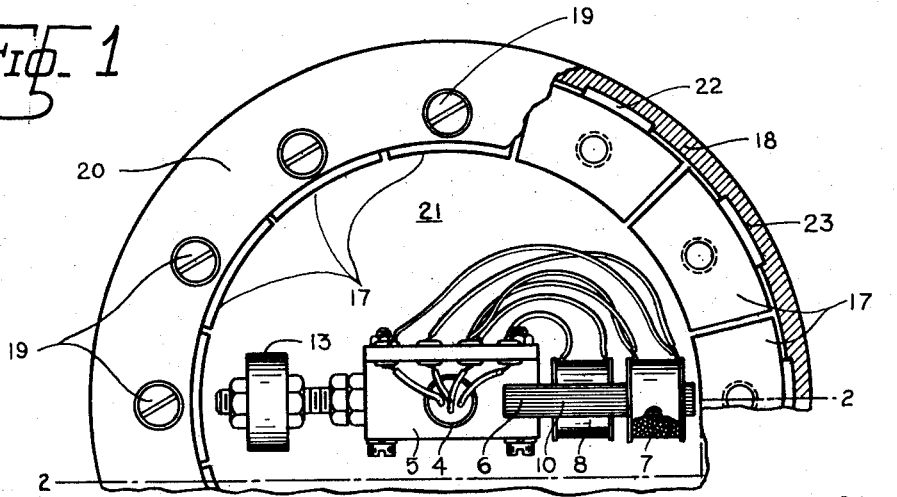
Figure 1 is a partial plan view, with portions in section, of a preferred embodiment of the compensator device of the present invention.
Figure 2:
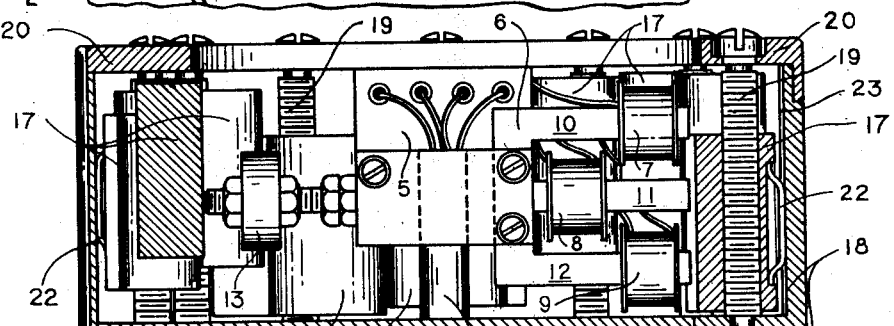
Figure 2 represents a cross-section of the compensator device of Figure 1 taken along the section line 2—2.

For the intended compensation purposes, a preferred deviation compensator embodiment herein disclosed comprises an annular stator and a rotor assembly which is angularly movable in relation to the stator and which yields output signals of desired phases and amplitudes when predetermined angular relationships are established between the rotor and stator. In Figures 1 and 2 there is illustrated, in plan and sectionalized side views respectively, a compensator which is adjustable to deliver outputs including twelve major and distinct electrical signals, each independently variable in phase and amplitude. The rotor structure of the compensator is angularly movable with the hollow rotor shaft 4, which is actuated by an element in the system wherein the compensator is utilized. A mounting block 5, preferably of non-magnetic material, is carried by shaft 4 and supports an E-shaped core of flux-conducting material, 6, having electrical windings 7, 8 and 9 on the three core legs 10, 11 and 12, respectively. Counterweight 13 maintains a balanced condition of the shaft by opposing the unbalancing effects of the E-shaped rotor unit. Windings 7, 8 and 9 are provided with electrical coupling leads secured to terminal strip 14 and passing through hollow shaft 4 to slip rings 15 cooperating with the sliding contacts 16. The stator structure includes twelve flux-conducting members, 17, each of which is substantially a sector of a hollow cylinder, and all of which are approximately the same length. These members are arranged in a generally annular pattern concentrically with the rotor axis, and are housed in the cylindrical outer casing 18 together with the rotor structure. Each flux-conducting stator member presents a surface of substantially 30 degrees of arc along the inner diameter of the annular stator assembly, but, for adjustment of the compensator output signals, each flux-conducting member is also independently movable in an axial direction parallel to the rotor shaft axis, one resulting staggered relationship of members 17 being portrayed in Figure 2. Twelve fillister-head dog-point machine screws, 19, are positioned between the front flange 20 and the inner transverse wall 21 of the casing 18, and each of these screws is threaded into an internally-threaded longitudinal opening in one of the flux-conducting members 17. Screws 19 serve to position the members 17 properly, and, when rotated by a tool such as a screwdriver, shift the members 17 in axial directions. Leaf springs 22 are recessed into the members 17 and slide in grooves 23 in casing 18 to prevent turning of the flux-conducting members 17 when they are adjusted by rotation of screws 19.

Electrical outputs of compensator signals are produced in the serially coupled output windings 7 and 9 mounted on the outer legs 10 and 12 of the E-shaped rotor structure. Exciting winding 8 on the center core leg 11 is energized with periodically varying electrical signals and causes the flow of electromagnetic flux in the flux-conducting laminations of the stack 6. However, the amplitude of signals induced in each of output windings 7 and 9 is dependent upon the reluctance of the flux paths between the end of center core leg 11 and the ends of outer core legs 10 and 12. When a greater amount of flux from winding 8 traverses core leg 10 than core leg 12, a greater amplitude of output signals is induced in output winding 7 than in the oppositely-wound output winding 9, whereupon the resultant amplitude of output signal from these serially-connected windings is the difference between the separate winding signals, and the phase of the resultant signal is that of the winding signal having the larger amplitude. The physical dimensions of the rotor core and the stator flux-conducting members are such that the members 17 may be axially shifted to accomplish the desired distribution of core fluxes between the two core legs 7 and 9, and, thereby, the desired adjustment of output signals obtains. For example, the position of the member 17 disposed opposite the open end of rotor core 6 in Figure 2 is such that it provides the lowest reluctance path for flux to flow between center core leg 11 and the outer core leg 12, while the reluctance to flux flow between center leg 11 and outer leg 10 is highest because member 17 is furthest removed from closure of a flux path between those core legs. Thus, in the example considered, the signals induced in winding 9 would be greater than those in winding 7, and, since the windings are arranged to provide output signals of opposite phase, the serially combined outputs would be of the phase of the winding 12, and of a maximum amplitude. Minimum resultant output signal is realized when a stator member is longitudinally centralized in relation to the three rotor core legs, inasmuch as the rotor fluxes are then evenly divided between the two outer core legs and the signals induced in the output windings are equal and opposite in character. It should be apparent that output signals of opposite phase and amplitudes intermediate the maxima of both phases may be readily obtained by appropriate axial movement of members 17 through the simple expedient of rotating the machine screws 19 from the front of flange 20. This arrangement lends itself to procurement of output signals of high accuracy, because each of the flux-conducting stator members 17 may be positioned with micrometer-like precision when proper threading of the machine screws is employed.

Substantially the same compensator output voltage appears during any angular range of rotor movement when the rotor core 6 is disposed opposite one of the flux-conducting members 17. In the compensator of Figures 1 and 2, the twelve adjustable members 17 provide a total of twelve distinct corrective output voltages, any one of which voltages obtains at least during the substantially thirty degrees of rotor movement when the E-shaped core is opposite the corresponding stator flux-conducting member. A compensator which is productive of output signals more closely approximating the ideal pattern of compensating signals in a particular system would, of course, incorporate a number of stations greater than twelve. It is one of the outstanding characteristics of this compensator arrangement that it accommodates numerous closely-spaced stations as a result of the simple structure wherein narrow flux-conducting members need only be moved axially to accomplish the required output voltage adjustments, the minimum required spacing between members being only sufficient to permit the relative axial movements.

Figure 3:
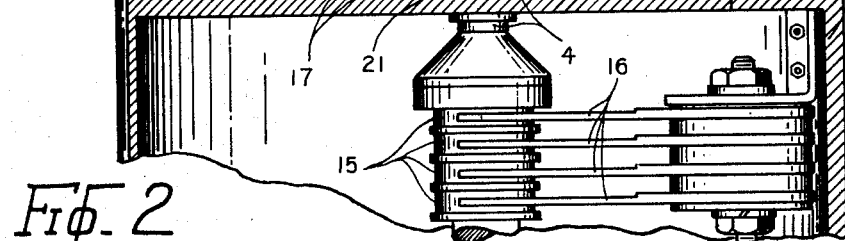
Figure 3 shows a pictorial and schematic view of an error compensated system incorporating the compensator device of this invention.
Figure 3:
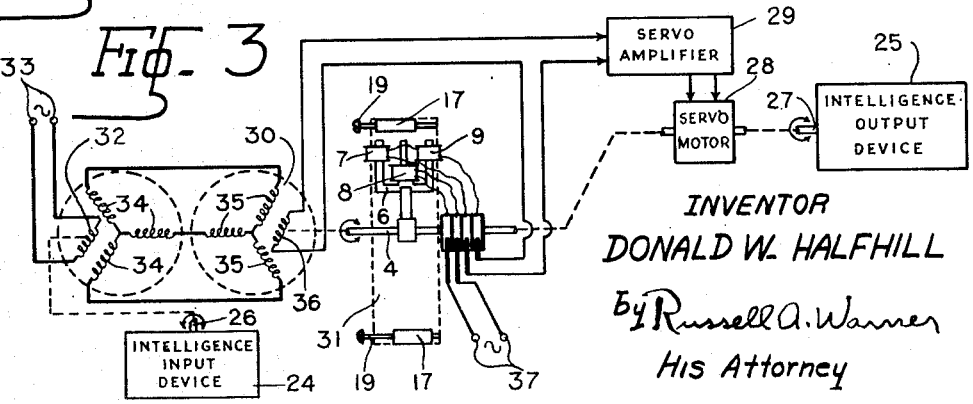

An analysis of the mode of operation of the deviation compensator herein disclosed is more readily comprehended with reference to the basic intelligence-conveying system of Figure 3 in which errors are minimized. The intelligence input device 24 and output device 25, each having a rotatable member whose angular orientations conveys intelligence, 26 and 27 respectively, may comprise the input and output elements of a transmission or servo system. For a given angular movement of the input shaft 26, there is produced a corresponding angular rotation of the output shaft 27 responsive to action of the servomotor 28 coupled therewith. Servomotor 28 is actuated in the conventional manner to rotate in either of two angular directions in accordance with electrical signals delivered thereto from the servo amplifier 29 which is excited by the combined electrical outputs of a synchro control transformer 30 and the deviation compensator 31. Coupled with the input shaft 26 is a synchro generator rotor winding 32 which is excited from alternating current supply terminals 33 and which induces in the generator stator windings 34 voltages which are characteristic of the rotor orientation. These stator winding voltages, when applied to the stator windings 35 of the synchro control transformer 30, produce a combined field having the same relative direction as the generator rotor field, and any lack of angular correspondence between the control transformer rotor winding 36 and the generator rotor winding 32 results in an output signal from rotor winding 36 which characterizes this lack of correspondence in both phase and amplitude. Control transformer rotor winding 36 is coupled for rotation with the output shaft 27 to insure that the output signals therefrom represent lack of angular correspondence between the input shaft 26 and output shaft 27. The electrical signal output of control transformer winding 36 is applied to the servo amplifier 29, and amplifier 29 in turn energizes servomotor 28 to actuate output shaft 27 and the control transformer winding 36 to the position where the signals from winding 36 are reduced to a null.

Because of system errors of both electrical and mechanical origin, the output and input shafts may not be in exact angular correspondence, and their lack of correspondence may vary in extent and sense for different angular orientations of the input shaft. Therefore, the deviation compensator 31 is incorporated into the system to provide outputs of corrective signals automatically, as needed. Its function is to apply to the servo amplifier 29 the precise electrical signal at the proper time to cause the output shaft 27 to be aligned in more nearly exact correspondence with input shaft 26. Compensator structure 31, although depicted in a schematic form, is similar to that of Figure 2, and, for purposes of clarity, the same numerals have been employed to designate elements which are the same in both figures. The rotor unit of the compensator is coupled and angularly movable with both the output shaft 27 and the synchro control transformer 36, and the exciting winding on the center leg of the E-shaped rotor core is energized through a slip-ring arrangement from electrical terminals 37. Electrical source signals applied to the synchro generator rotor terminals 33 and the compensator rotor terminals 37 are of the same periodicity because the compensator and control transformer output signals must be combined and because the compensator produces output signals of the same periodicity as the input signals applied to the rotor exciting winding 8. For any predetermined angular orientation, the compensator rotor output windings 7 and 9 produce a resultant of their serially-combined outputs which has a phase and amplitude dependent upon the axial position of the stator member 17 opposite which it is then disposed, in the manner described hereinbefore. Reduction of deviations or errors between positions of input and output shafts 26 and 27 is thus secured by setting the input shaft at a plurality of angular positions and axially adjusting the corresponding compensator stator member until the output shaft 27 is coerced into angular agreement with shaft 26. When this procedure has been followed, the movements of both shafts continue to be in correspondence thereafter unless new electrical or mechanical sources of errors are introduced into the system.

It should be apparent that the foregoing embodiment is susceptible of modification and variation within the scope of this invention. Thus, in Figure 3, it is intended that the compensator rotor may be rotatable with the system input shaft, rather than the output shaft, with comparable advantageous results. Additionally, the compensator unit itself may be altered by varying the shape, number or spacings of the stator flux-conducting members, by coupling input and output signals inductively rather than with slip rings, and by employing the rotor structure as a stator element and the stator as a rotor, whereby electrical signals need not be translated by a rotatable member.

While particular embodiments of the subject invention have been shown and described herein, these are in the nature of description rather than limitation, and it will occur to those skilled in the art that various changes, modifications, and combinations may be made within the province of the appended claims without departing in spirit or scope from this invention in its broader aspects.

What I claim as new and desire to secure by Letters Patent of the United States is:

1. A compensator device comprising a rotor, an electromagnet winding mounted on said rotor and energized with alternating current signals, a pair of output windings mounted on said rotor and positioned to have voltages of opposite phase induced therein by flux from said electromagnet winding, and a plurality of flux-conducting members arranged annular about said rotor, each of said members being movable to adjust in any proportions the amounts of rotor flux intercepted by each of said output windings when said rotor is opposite said member.

2. A compensator device comprising a rotor, a three-legged flux-conducting core mounted on and rotatable with said rotor, an electromagnet winding positioned on one of said core legs and energized with alternating current signals, a pair of serially-coupled output windings, each of said output windings being positioned on another separate one of said core legs such that voltages of opposite phase are induced in said windings by flux from said electromagnet winding, a plurality of flux-conducting members mounted independently of said rotor and at different angular positions relative to said rotor, and means for adjusting the positions of each of said members to proportion the magnetic reluctances established thereby between said one core leg and each of said other core legs when said core is disposed opposite said member.

3. A compensator device comprising a rotor, an E-shaped flux-conducting core mounted on said rotor for rotation therewith, an exciting winding mounted on the center leg of said core and energized with alternating current signals, a pair of serially-coupled output windings, each of said output windings being wound about one of the outer legs of said core such that voltages of opposite phase are induced in said output windings by flux from said exciting winding, a plurality of flux-conducting stator members each positioned to be disposed opposite said rotor core only when said rotor has a predetermined unique angular orientation, and means for adjusting the position of each of said stator members relative to said rotor core legs to proportion the reluctances established by said member between said center core leg and each of said outer core legs, and thereby to adjust the voltages in said output windings.

4. A compensator device as set forth in claim 3 wherein said rotor core is mounted with said legs extending radially outward in the same radial plane, wherein said flux-conducting members are elongated and positioned with their longitudinal axes parallel to the axis of rotation of said rotor, and wherein said adjusting means positions said flux-conducting members axially, and further comprising means for applying combined voltages from said output windings to an output circuit.

DONALD W. HALFHILL.

References Cited in the file of this patent

UNITED STATES PATENTS

| Number | Name | Date |
| --- | --- | --- |
| 2,484,022 | Esval | Oct. 11, 1949 |